(12) United States Patent
Hasegawa et al.

(10) Patent No.: US 10,919,268 B1
(45) Date of Patent: Feb. 16, 2021

(54) COATINGS FOR MULTILAYER INSULATION MATERIALS

(71) Applicant: United States of America as represented by the Administrator of NASA, Washington, DC (US)

(72) Inventors: Mark Hasegawa, Greenbelt, MD (US); Kenneth O'Connor, Greenbelt, MD (US); Alfred Wong, Greenbelt, MD (US); George Harris, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/583,349

(22) Filed: Sep. 26, 2019

(51) Int. Cl.
*B32B 15/04* (2006.01)
*B32B 17/06* (2006.01)
*B32B 15/08* (2006.01)

(52) U.S. Cl.
CPC ........... *B32B 15/08* (2013.01); *B32B 2311/04* (2013.01); *B32B 2311/08* (2013.01); *B32B 2311/22* (2013.01); *B32B 2311/24* (2013.01)

(58) Field of Classification Search
CPC ............ C03C 10/0009; C03C 17/3417; C03C 2217/73; C03C 3/085; C03C 3/091; C03C 2217/734; Y10T 428/26; Y10T 428/31; Y10T 428/12611; Y10T 428/12618; Y10T 428/1317; G02B 1/11; G02B 5/0816
USPC ................. 428/426, 428, 432, 688, 701, 702
See application file for complete search history.

(56) References Cited

U.S. PATENT DOCUMENTS

| | | | | |
|---|---|---|---|---|
| 5,019,458 A * | 5/1991 | Elgat | ....................... | C03C 17/36 359/883 |
| 5,583,704 A * | 12/1996 | Fujii | .................... | G02B 5/0858 359/884 |
| 5,828,493 A * | 10/1998 | Bischer, Jr. | ........... | C23C 14/022 359/584 |
| 6,310,737 B1 * | 10/2001 | Gillich | ..................... | G02B 1/14 359/883 |
| 6,709,119 B2 * | 3/2004 | Gillich | ..................... | G02B 5/08 359/883 |
| 6,848,797 B1 * | 2/2005 | Gillich | ................. | G02B 5/0858 359/883 |
| 6,957,895 B2 * | 10/2005 | Sawamura | ........... | G02B 5/0858 359/883 |
| 7,838,134 B2 * | 11/2010 | Wolfe | ................. | G02B 5/0891 428/701 |
| 9,611,999 B2 * | 4/2017 | Cai | ......................... | G02B 5/08 |
| 10,429,549 B2 * | 10/2019 | Schurmann | ............. | G02B 1/14 |
| 2003/0111594 A1 * | 6/2003 | Getin | .................... | G21K 1/006 250/251 |
| 2010/0313875 A1 * | 12/2010 | Kennedy | ................. | F24S 70/30 126/652 |

(Continued)

*Primary Examiner* — Lauren R Colgan
(74) *Attorney, Agent, or Firm* — Matthew F. Johnston; Bryan A. Geurts; Helen M. Galus

(57) ABSTRACT

A laminate has a composite coating on a reflective substrate. The composite coating includes a stack of metal oxide trilayers on the substrate, where each metal oxide trilayer includes a layer of aluminum oxide; a layer of silicon oxide; and a layer of indium tin oxide. The composite coating also includes a stack of metal oxide bilayers on the metal oxide trilayer stack, each metal oxide bilayer including a layer of aluminum oxide and a layer of silicon oxide.

18 Claims, 2 Drawing Sheets

(56) References Cited

U.S. PATENT DOCUMENTS

2013/0222933 A1* 8/2013 Eguro .................... F24S 23/70
359/838
2018/0220491 A1* 8/2018 Prasher ................ H05B 3/009

* cited by examiner

COATINGS FOR MULTILAYER INSULATION MATERIALS

ORIGIN OF THE INVENTION

The invention described herein was made by an employee of the United States Government, and may be manufactured and used by or for the Government for Government purposes without the payment of any royalties thereon or therefore.

TECHNICAL FIELD

This disclosure relates generally to multilayer insulation materials for use in space environments, which offer low solar absorbance, low IR reflectance, and high IR emittance.

BACKGROUND

Materials which offer a low ratio of solar absorbance (a) to IR emittance (EN) are useful in space applications. Indium tin oxide (ITO)-coated silver fluorinated ethylene-propylene (FEP) Teflon does provide a low α/εN ratio, but the ITO coating on the silver Teflon is fragile and easily damaged. Silver-coated glass panes have good optical properties, but are not flexible and may be prone to breakage.

Reflective laminates with a flexible substrate, an aluminum oxide layer (10,000-20,000 A), and a silicon oxide (4,000-8,000 A) layer are known. The thickness of the oxide layer can be adjusted to increase IR emittance up to about 0.6.

SUMMARY OF EMBODIMENTS

Various embodiments disclosed herein relate to a laminate, including a reflective support, a plurality of metal oxide trilayers on the reflective support, and a plurality of metal oxide bilayers on the plurality of metal oxide trilayers. Each metal oxide trilayer includes a layer of aluminum oxide, a layer of silicon oxide, and a layer of indium tin oxide. Each metal oxide bilayer includes a layer of aluminum oxide and a layer of silicon oxide.

The reflective support used in the disclosed laminates may include a flexible substrate, a 200 to 2000 angstrom thick layer of a reflective metal, e.g., gold, silver, or aluminum; a 200 to 5000 angstrom thick adhesion layer, e.g., Nichrome, between the substrate and the reflective metal; and a 500 to 5000 angstrom metal oxide layer on the reflective metal layer. The flexible substrate may be a polymeric film having a melting point of at least 200° C., e.g., a polyester film or a polyimide film.

The metal oxide trilayers in the disclosed laminates may include a 1000 to 2000 angstrom thick layer of aluminum oxide; a 500 to 2000 angstrom thick layer of silicon oxide; and a 10 to 200 angstrom thick layer of indium tin oxide. The metal oxide bilayers may include a 1000 to 2000 angstrom thick layer of aluminum oxide and a 500 to 2000 angstrom thick layer of silicon oxide. In various embodiments, four trilayers are deposited on the reflective support and from two to twenty bilayers, e.g., four, eight, or twelve bilayers, are deposited on the metal oxide trilayers.

The disclosed laminates may have a solar absorbance of from 0.07 to 0.3, or from 0.09 to 0.23. The disclosed laminates may have an IR emittance of from 0.75 to 0.9, or from 0.8 to 0.86.

The laminate of claim 1, wherein the laminate further comprises a 50 to 200 angstrom thick layer of indium tin oxide on the outermost bilayer.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features of the present invention are more fully disclosed in the following specification, reference being had to the accompanying drawings, in which.

Figure 1:
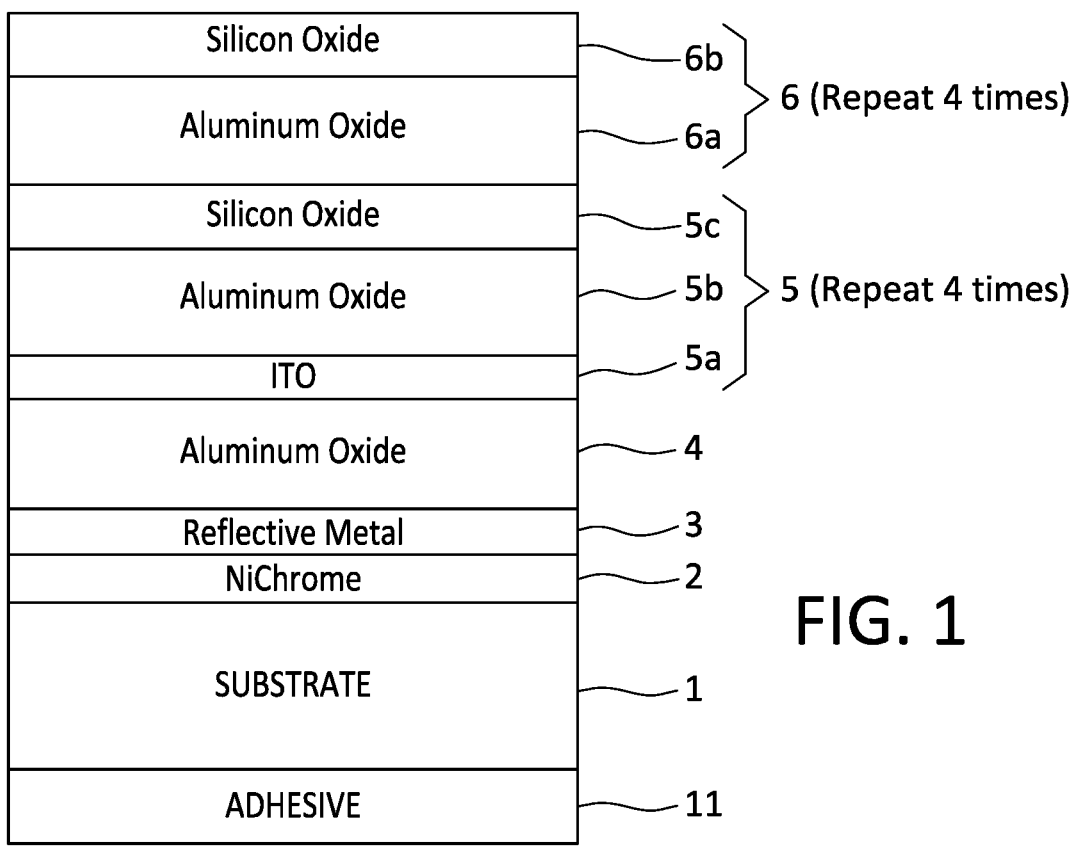
FIG. 1 shows a laminate with a composite coating as disclosed herein, where the laminate includes four metal oxide bilayers and four metal oxide trilayers, with indium tin oxide layers beneath the outermost metal oxide layer.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions.

The term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

"Metallized," as used herein, means deposition of a metal film by vapor deposition. "Aluminized," as used herein, means deposition of an aluminum film by vapor deposition.

"Solar absorbance," as used herein, means absorbance of light having a wavelength of 250 nm to 2.5 microns.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein.

The terms "substantially," "essentially," "approximately," "about" or any other version thereof, are defined as being close to as understood by one of ordinary skill in the art, and in one non-limiting embodiment the term is defined to be within 15%, within 10%, in another embodiment within 5%, in another embodiment within 1% and in another embodiment within 0.5%. Unless otherwise indicated, all numbers not limited by a term such as "approximately" or "about" are defined by the significant figures presented herein, e.g., "10" is 9.5 to 10.49; "100" is 99.5 to 100.49; etc. The term "coupled" as used herein is defined as connected, although not necessarily directly and not necessarily mechanically. A device or structure that is "configured" in a certain way is configured in at least that way, but may also be configured in ways that are not listed.

Various embodiments disclosed herein relate to an improved laminate with a composite coating for use in space environments. The improved laminate offers improved radiative thermo-optical properties over existing GSFC (Goddard Space Flight Center) composite coatings at reduced thicknesses. The new laminates provide surfaces with an IR emittance which may be greater than 0.7, greater than 0.75, greater than 0.78, greater than 0.8, or greater than 0.85; or between 0.7 to 0.9, 0.8 to 0.88, or 0.82 to 0.85. The new laminates also provide a low solar absorbance, ranging from 0.07 to 0.3, 0.08 to 0.23, 0.09 to 0.2, or 0.08 to 0.15. In various embodiments, the new laminates provide a ratio of solar absorbance ($\alpha$) to emissivity ($\varepsilon$) such that $0.3 > \alpha/\varepsilon > 0.1$, $0.2 > \alpha/\varepsilon > 0.1$, or $0.15 > \alpha/\varepsilon > 0.11$.

The coating incorporates space stable materials in a new layered structure. Various embodiments disclosed herein relate to an improved laminate with a composite coating for use in space environments. In various embodiments, the composite includes a reflective substrate with a plurality of metal oxide trilayers deposited thereon. The composite may include a reflective substrate with a plurality of metal oxide trilayers and a plurality of metal oxide bilayers deposited thereon.

The disclosed coating incorporates thin films of indium tin oxide, functioning as an IR absorber, into a recurring multilayered thin film matrix of aluminum and silicon oxides. This multilayered system shows high IR emittance values, which may exceed 0.85 and rival emittance values obtained with mirrors. The disclosed coatings provide absorption bands between wavelengths of 3 and 9 microns, as well as for wavelengths over 25 microns.

The laminate may have a support which is reflective and flexible. The support may include, in sequence, a flexible substrate; an adhesion layer, which may be a layer of nickel or a nickel alloy, e.g., a 100 to 1000 angstrom thick layer of nickel-chromium alloy; a layer of a reflective metal, e.g., a 500 to 5000 angstrom thick layer of silver, aluminum, or gold; and a metal oxide layer, e.g., an aluminum oxide or silicon oxide layer, which may be 500 to 2000 angstroms thick.

A plurality of metal oxide trilayers, e.g., from two to eight trilayers, are positioned on the reflective support, where each metal oxide trilayer includes a layer of aluminum oxide; a layer of silicon oxide; and a layer of indium tin oxide (ITO). In various embodiments, four metal oxide trilayers are deposited on the reflective metal layer of the substrate. The four metal oxide trilayers may be sequentially deposited on the reflective metal substrate.

In various embodiments, the support includes an aluminum oxide layer on the reflective layer. An indium tin oxide (ITO) layer may be deposited directly on the aluminum oxide layer of the support, with the layers of each trilayer being deposited in the sequence $ITO/SiO_2/Al_2O_3$ or $ITO/Al_2O_3/SiO_2$. A silicon oxide layer may be deposited directly on the aluminum oxide layer of the support, with the layers of each trilayer being deposited in the sequence $SiO_2/ITO/Al_2O_3$ or $SiO_2/Al_2O_3/ITO$. The support may include a silicon oxide layer on the reflective layer, with the layers of each trilayer being deposited on the silicon oxide layer of the support in the sequence $ITO/SiO_2/Al_2O_3$, $ITO/Al_2O_3/SiO_2$, $Al_2O_3/ITO/SiO_2$, or $Al_2O_3/SiO_2/ITO$. In various embodiments, each trilayer includes a 1000 to 2000 angstrom thick layer of aluminum oxide; a 500 to 2000 angstrom thick layer of silicon oxide; and a 10 to 200 angstrom thick layer of indium tin oxide.

On top of the plurality of metal oxide trilayers, a plurality of metal oxide bilayers are deposited. Each metal oxide bilayer includes a layer of aluminum oxide and a layer of silicon oxide. A silicon oxide layer may be deposited directly on the outermost trilayer, i.e., the trilayer most remote from the support, with the layers of each bilayer being deposited in the sequence $Al_2O_3/SiO_2$ or $SiO_2/Al_2O_3$. In various embodiments, from two to twenty metal oxide bilayers are deposited on the outermost trilayer. The number of sequentially deposited bilayers may be a multiple of four, e.g., four, eight, or twelve bilayers. Each metal oxide bilayer may include a 1000 to 2000 angstrom thick layer of aluminum oxide; and a 500 to 2000 angstrom thick layer of silicon oxide.

In various embodiments, the laminates disclosed herein have a composite coating with a plurality of indium tin oxide layers spaced from each other by an aluminum oxide layer and a silicon oxide layer. Each indium tin oxide layer may be buried under a surface of the laminate under a plurality of sequentially deposited $SiO_2/Al_2O_3$ bilayers.

In various embodiments, an additional metal oxide layer may be deposited on the outermost $SiO_2/Al_2O_3$ bilayer. The additional metal oxide layer may be a protective silicon oxide or aluminum oxide cap layer, which may be from 2,000 to 10,000 angstroms thick. The additional metal oxide layer may be a conductive indium tin oxide layer, which may be from 50 to 500 angstroms thick.

FIG. 1 shows a laminate with a multilayer coating deposited on a support. The support includes substrate 1, which may include a flexible metal foil or a flexible polymeric film or sheet. If a polymeric film or sheet is used as substrate 1, the film or sheet may be made from a polymer with a melting point or decomposition point above 200° C., including but not limited to polyesters, e.g., polyethylene terephthalate (PET), or polyimides, which may optionally be loaded with conductive carbon. Useful polyimide film substrates are available from DuPont™ under the trade name Kapton®, and are produced from the condensation of pyromellitic dianhydride and 4,4'-oxydiphenylamine. Carbon loaded polyimides are conductive, and provide a roughened matte surface. In the absence of conductive carbon, polyimides are insulators, and provide a smooth, reflective surface. In various embodiments, the substrates may be 0.5 mil to 5 mil, 1 to 4 mil, or 2 to 3 mil thick polyimide film substrates. Useful polyester substrates include amorphous, monoaxially oriented, or biaxially oriented polyesters.

The support additionally includes a reflective layer 3, and an adhesion layer 2 between substrate 1 and reflective layer 3. The reflective layer 3 may be a layer including 200-2,000 angstroms of a metal which may be silver, gold, aluminum, or alloys thereof. Adhesion layer 2 may be a layer including 200 to 5000 angstroms of chromium, nickel, or an alloy thereof. The metal in adhesion layer 2 may be deposited on the substrate 1 in the form of a metal or a substoichiometric metal oxide. Adhesion layer 2 may be sputter-deposited on substrate 1, and reflective layer 3 may be sputter-deposited on adhesion layer 2. Finally, the support may include a layer of metal oxide 4, e.g., an aluminum oxide or silicon oxide layer 4, deposited on the reflective layer. The adhesion layer 2, the reflective layer 3, and the metal oxide layer 4 may be sequentially deposited on the substrate by vacuum deposition. Each vacuum deposition step may be electron beam physical vapor deposition, resistive thermal physical vapor deposition, or chemical vapor deposition.

The multilayer coating in FIG. 1 includes:
a plurality of metal oxide trilayers 5; and
a plurality of metal oxide bilayers 6.

In various embodiments, each metal oxide trilayer 5 includes a layer of aluminum oxide 5b; a layer of silicon oxide 5c; and a layer of indium tin oxide 5a. In various embodiments, each trilayer includes a layer of aluminum oxide 5b which may be 300 to 3000 angstroms thick, 400 to 2000 angstroms thick, or 500 to 1500 angstroms thick; a layer of silicon oxide 5c which may be 300 to 3000 angstroms thick, 400 to 2000 angstroms thick, or 500 to 1500 angstroms thick; and a layer of indium tin oxide 5a which may be 10 to 200 angstroms thick, 30 to 150 angstroms thick, or 60 to 120 angstroms thick. In various embodiments, the multilayer coating may include from 2 to 12, from four to eight, or about 4 trilayers 5. The trilayers 5 may collectively be from 2,440 to 16,800 angstroms thick, from 4360 to 7860 angstroms thick, or from 5000 to 6100 angstroms thick. Within each trilayer, a ratio of the thickness of the aluminum oxide layer 5b to the thickness of the silicon oxide layer 5c may be from 3:1 to 1:3, from 3:1 to 1:2, from 3:1 to 1:1, from 2.5:1 to 1:1, from 2:1 to 1:1, or from 1.5:1 to 1:1.

In various embodiments, each metal oxide bilayer 6 includes a layer of aluminum oxide 6a and a layer of silicon oxide 6b. In various embodiments, each bilayer includes a layer of aluminum oxide 6a which may be 300 to 2000 angstroms thick, 500 to 1750 angstroms thick, or 750 to 1500 angstroms thick; and a layer of silicon oxide 6b which may be 300 to 2000 angstroms thick, 400 to 1500 angstroms thick, or 500 to 1000 angstroms thick. The multilayer coating may include from 2 to 20, or from four to twelve, or about 4 bilayers 6. The number of bilayers in the multilayer coating may be a multiple of 4, e.g., there may be 4, 8, 12, 16, or 20 bilayers 6. The bilayers 6 may collectively be from 2,400 to 16,000 angstroms thick, from 3,600 to 13,000 angstroms thick, or from 5,000 to 1,000 angstroms thick.

In various embodiments, the laminate includes a stack of four trilayers 5, where the stack of four trilayers 5 is from 2,440 to 16,800 angstroms thick; and a stack of four bilayers 6, where the stack of four bilayers 6 is from 2,400 to 16,000 angstroms thick. The laminate may further include a 500 to 2000 angstrom thick layer of aluminum oxide 4 between the reflective metal layer 3 of the support and the trilayer stack. The total metal oxide thickness from the surface of the reflective layer 3 to the surface of the outermost bilayer 6 may be from 5340 angstroms (0.53 microns) to 34,800 angstroms (3.48 microns), or about 0.5 microns to about 3.5 microns, about 0.75 microns to about 3 microns, about 1 micron to about 2.5 microns, or about 2 microns to 3 microns.

The laminate may include:
a 500 to 2000 angstrom thick layer of aluminum oxide 4 on the reflective metal layer 3 of the support;
a stack of four trilayers 5, where the stack of four trilayers is from 2,440 to 16,800 angstroms thick, on the layer of aluminum oxide;
a stack of four, eight, or twelve bilayers 6, where the stack of four bilayers is from 2,400 to 16,000 angstroms thick, or from 4,800 to 10,000 angstroms thick, on the stack of trilayers; and
a metal oxide cap layer 12 on the bilayer stack.

The cap layer may be a conductive metal oxide surface layer, which may be 25 to 200 angstroms thick, or a protective metal oxide layer, which may be from 2000 to 10,000 angstroms thick. The total metal oxide thickness from the surface of the reflective layer to an exposed surface of an indium tin oxide cap layer 12 may be from 5365 angstroms (0.54 microns) to 35,000 angstroms (3.50 microns), about 0.75 microns to about 3 microns, about 1 micron to about 2.5 microns, or about 2 microns to 3 microns. The total metal oxide thickness from the surface of the reflective layer to an exposed surface of a protective metal oxide cap layer 12 may be from 6000 angstroms (0.6 microns) to 40,000 angstroms (4 microns), from 0.63 microns to 36,800 3.68 microns, about 0.75 microns to about 3 microns, about 1 micron to about 2.5 microns, or about 2 microns to 3 microns.

If a cap layer 12 is present, the cap layer 12 may be a conductive metal oxide selected from the group consisting of indium oxide, tin oxide, indium tin oxide, or a doped zinc oxide. The cap layer may be a protective metal oxide film of silicon oxide, aluminum oxide, titanium oxide, or mixtures thereof.

The various layers deposited on the flexible support, including the layers in each bilayer, the layers in each trilayer, and the optional cap layer, may be deposited by vacuum deposition. Each vacuum deposition step may be electron beam physical vapor deposition, resistive thermal physical vapor deposition, or chemical vapor deposition.

In various embodiments, the substrate 1 may have an adhesive layer 11 on a side opposite from trilayers 5 and bilayers 6, as shown in FIG. 1. The adhesive layer 11 allows the substrate 1 to be adhered to a flat or curved surface. Adhesion of the laminate to a surface with low solar absorbance or low emittance may increase absorbance or emittance, if desired.

Comparative Example 1

Figure 3:
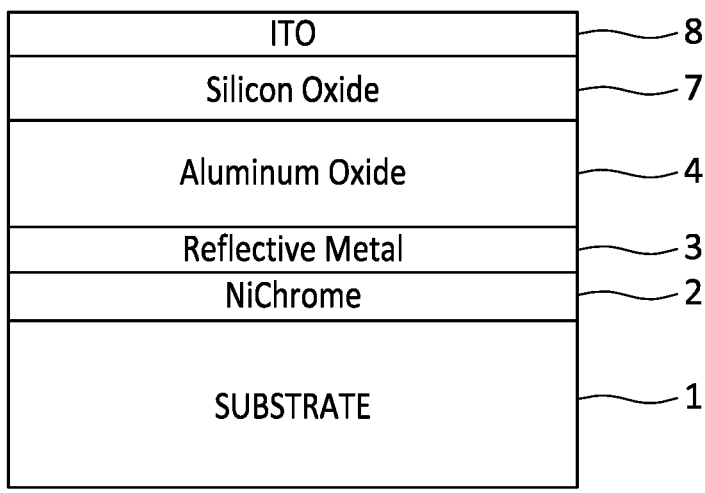
FIGS. 3 and 4 show comparative laminates with indium tin oxide surface layers.

A three-layer stack, shown in FIG. 3, was deposited on a flexible support. The flexible support included a polyimide substrate 1, a 500 angstrom layer of a nickel-chromium (Nichrome) alloy 2 deposited on the polyimide substrate, and a 1,200 angstrom reflective aluminum layer 3 deposited on the Nichrome alloy.

An 18,000 angstrom thick layer of aluminum oxide 4 was deposited on silver layer 3. Next, a 6,000 angstrom thick layer of silicon oxide 7 was deposited on aluminum oxide layer 4. The resulting $Al_2O_3/SiO_2$ bilayer was 24,000 angstroms thick, or about 2.4 microns thick. Finally, a 100 angstrom thick layer of indium tin oxide was deposited on the silicon oxide layer 7.

The resulting laminate of FIG. 3 had a solar absorbance of 0.08, and an IR emissivity of 0.65.

Example 1. Impact of Submerged Indium Tin Oxide Layers on Laminate Properties Six reflective supports, substantially similar to those used in Comparative Example 1, were coated with an oxide coating which ranged from about 2000 angstroms thick to about 3800 angstroms thick, as seen in Table 1. The initial emissivity ε of each reflective support was recorded, as seen in Table 1. The initial emissivity E of the six supports ranged between 0.48 and 0.63, with the emissivity increasing as the thickness of the oxide coating increased. The sample of Comparative Example 1 is shown in Table 1 as Sample 7, which has an emissivity of 0.65. As seen in Table 1, increasing the oxide coating thickness from 2000 angstroms thick to 3800 angstroms thick significantly increases emissivity. A further increase in the oxide coating thickness from 3800 angstroms (0.38 microns) to 24,000 angstroms (2.4 microns) has little impact on emissivity.

Each of supports 1-6 was then coated with a series of four metal oxide trilayers. A first trilayer included a 90 angstrom first coating of indium tin oxide, a 500 angstrom second coating of aluminum oxide, and a 500 angstrom third coating of silicon oxide. The second trilayer was similar to the first trilayer, except that the second and third coatings were each 750 angstroms thick. The third trilayer was similar to the second trilayer, except that the second and third coatings were each 1,000 angstroms thick. In the fourth trilayer, the thickness of each of the second and third coatings was increased to 1,500 angstroms thick. The resulting trilayer stack was about 7,850 to about 7,900 angstroms thick. After deposition of the trilayer stack, the total oxide thickness, including the initial oxide coating, ranged from 9,800 angstroms to 11,600 angstroms.

Subsequent to deposition of the trilayer stacks, the emissivity E of the six coated supports was recorded. Each support had an emissivity of between 0.71 and 0.74. The trilayer stack, which introduced four spaced subsurface indium tin oxide layers, also increased solar absorbance in the 3 to 8 micron range, relative to a support lacking a trilayer stack.

After trilayer deposition, each of samples 1-6 offered improved emissivity at reduced thickness, compared to the sample of Comparative Example 1.

TABLE 1

| Sample | Initial Oxide Coating On Support (Å)[1] | Emissivity (Prior to Trilayer Deposition) | Emissivity (After Trilayer Deposition) |
| --- | --- | --- | --- |
| 1 | 1988 | 0.48 | 0.71 |
| 2 | 2520 | 0.53 | 0.75 |
| 3 | 3384 | 0.57 | 0.74 |
| 4 | 3508 | 0.58 | 0.74 |
| 5 | 3632 | 0.60 | 0.74 |
| 6 | 3752 | 0.63 | 0.74 |
| 7[2] | 24,000 | 0.65 | — |

[1]The oxide coating on samples 1-6 is a bilayer, including a layer of about 1500 Å to 2800 Å alumina, and from about 500 to 950 Å silica.
[2]Sample 7 is the laminate of Comparative Example 1. No metal oxide trilayers were deposited on Sample 7.

Example 2. Laminate Comprising a 20-Layer Stack on a Flexible Support

A twenty-layer stack was deposited on a flexible support. The flexible support included a polyimide substrate 1, a 500 angstrom layer of a nickel-chromium (Nichrome) alloy 2 deposited on the polyimide substrate, a 1,200 angstrom reflective aluminum layer 3 deposited on the Nichrome alloy, and a 2,000 angstrom layer of alumina 4 deposited on the reflective layer, as shown in FIG. 1.

A multilayer metal oxide stack was then deposited on the exposed surface of alumina layer 4.

First, a metal oxide trilayer 5 was deposited on layer 4 by vacuum deposition. First, a 100 angstrom thick layer of indium tin oxide 5a was deposited on layer 4, as shown in FIG. 1. Next, a 1,400 angstrom thick layer of aluminum oxide 5b was deposited on indium tin oxide layer 5a. Finally, a 1,400 angstrom thick layer of silicon oxide 5c was deposited on aluminum oxide layer 5b. The resulting trilayer 5 was 2,900 angstroms thick, or about 0.3 microns thick. This series of steps was repeated three times, producing a stack of four substantially identical trilayers 5 sequentially deposited on alumina layer 4. The trilayer stack was about 1.2 microns thick, and included twelve individual layers (four indium tin oxide layers, four silicon oxide layers, and four aluminum oxide layers).

Next, a metal oxide bilayer 6 was deposited on the stack of trilayers 5 by vacuum deposition. First, a 2,800 angstrom thick layer of aluminum oxide 6a was deposited on the outermost trilayer 5. Then a 1,400 angstrom thick layer of silicon oxide 6b was deposited on aluminum oxide layer 6a, as shown in FIG. 1. The resulting bilayer 6 was 4,200 angstroms thick, or about 0.42 microns thick. This series of steps was repeated three times, producing a stack of four substantially identical bilayers 6 sequentially deposited on the stack of trilayers 5. The bilayer stack was about 1.6 to 1.8 microns thick, and included eight individual layers. The total combined thickness of trilayers 5 and bilayers 6 was from 2.8 to 3 microns.

The resulting laminate of FIG. 1 had a solar absorbance a of 0.23, and an IR emissivity E of 0.86.

Example 3. Laminate Comprising a 28-Layer Stack on a Flexible Support

Figure 2:
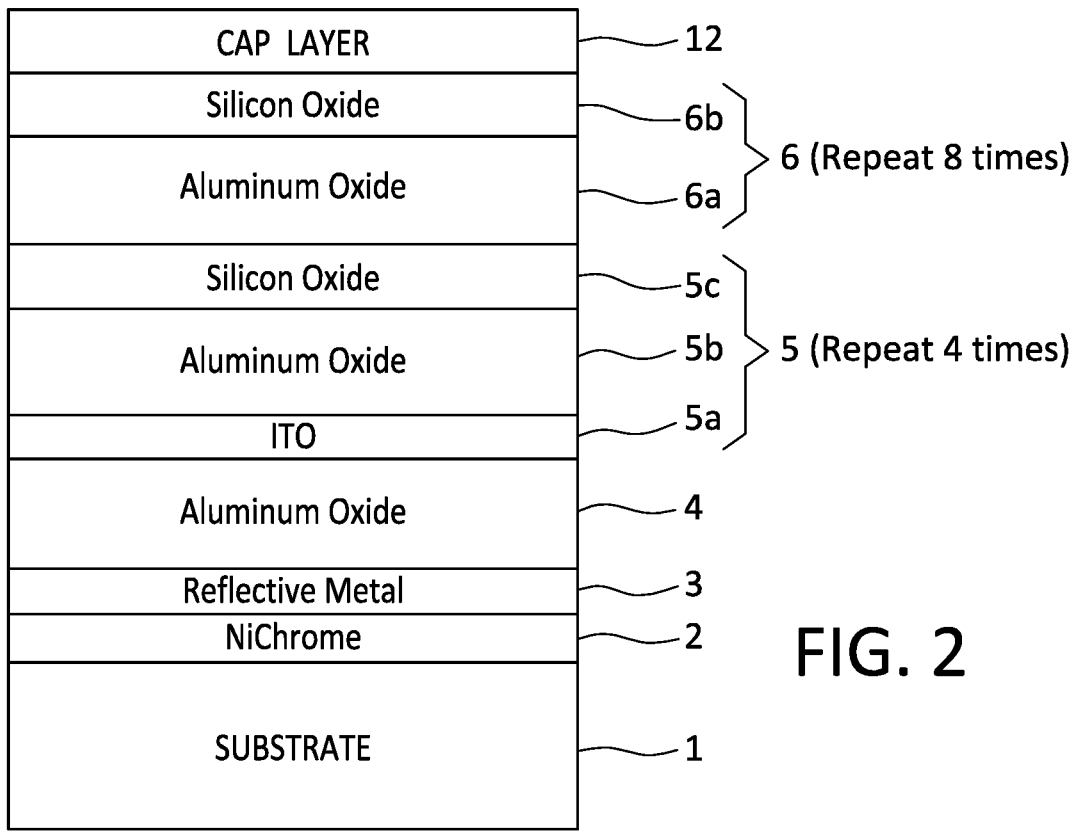
FIG. 2 shows a laminate with a composite coating as disclosed herein, where the laminate includes eight metal oxide bilayers and four metal oxide trilayers.

A stack with twenty-eight layers, shown in FIG. 2, was deposited on a flexible support. The flexible support was substantially similar to that used in Example 2, except that a 1,200 angstrom reflective silver layer 3 was used in place of an aluminum layer.

A multilayer metal oxide stack was then deposited on the exposed surface of alumina layer 4, as shown in FIG. 2.

First, a metal oxide trilayer 5 was deposited on layer 4 by vacuum deposition. A 30 angstrom thick layer of indium tin oxide 5a was deposited on layer 4, as shown in FIG. 2. Next, a 1,500 angstrom thick layer of aluminum oxide 5b was deposited on indium tin oxide layer 5a. Finally, a 750 angstrom thick layer of silicon oxide 5c was deposited on aluminum oxide layer 5b. The resulting trilayer 5 was 2,280 angstroms thick, or about 0.23 microns thick. This series of steps was repeated three times, producing a stack of four 0.23 micron thick trilayers 5. The trilayer stack was about 0.92 to 0.95 microns thick.

Next, a series of metal oxide bilayers 6 was deposited on the stack of trilayers 5 by vacuum deposition. First, a 1,500 angstrom thick layer of aluminum oxide 6a was deposited on the outermost trilayer 5. Then, a 750 angstrom thick layer of silicon oxide 6b was deposited on aluminum oxide layer 6a, as shown in FIG. 2. The resulting bilayer 6 was 2,250 angstroms thick, or about 0.23 microns thick. This series of steps was repeated three times, producing a stack of four 0.23 micron thick bilayers 6 sequentially deposited on the stack of trilayers 5.

Finally, a further series of metal oxide bilayers 6 was deposited by depositing four additional 750 angstrom thick layer of aluminum oxide 6a, alternating with four additional 750 angstrom thick layer of silicon oxide 6a. This step produces a stack of four 0.15 micron thick bilayers 6. The total thickness of bilayers 6 was about 1.52 microns, while the total combined thickness of all bilayers 6 and trilayers 5 was about 2.44 microns thick.

Finally, a 5,000 angstrom thick silica cap layer 12 was deposited on the outermost bilayer, as shown in FIG. 2.

The resulting laminate of FIG. 2 had a solar absorbance of 0.09, and an IR emissivity of 0.80.

Examples 2 and 3 show that the combination of ITO/$Al_2O_3$/$SiO_2$ trilayers and $Al_2O_3$/$SiO_2$ bilayers on a support allows production of a laminate with an emissivity of 0.8 or greater, at a total oxide thickness of about 3 microns or less.

Example 4

Figure 4:
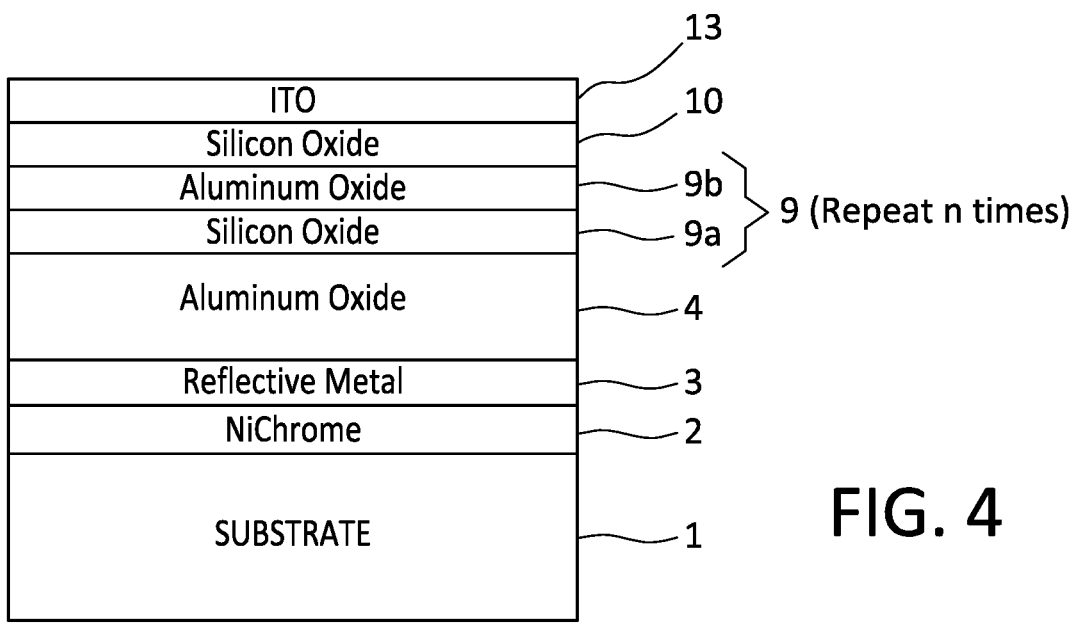

A multilayer stack, shown in FIG. 4, was deposited on a flexible support. The flexible support was substantially similar to that used in Comparative Example 1.

A 6,000 angstrom thick layer of aluminum oxide 4 was deposited on silver layer 3. Next, a 1,600 angstrom thick layer of silicon oxide 9a was deposited on aluminum oxide layer 4, followed by deposition of a 4,800 angstrom thick layer of aluminum oxide 9b, producing a 6,400 angstrom thick $SiO_2$/$Al_2O_3$ bilayer 9. Two identical bilayers 9 were then deposited sequentially on the first bilayer, producing an approximately 19,000 angstrom thick stack of bilayers 9 on aluminum oxide layer 4, as shown in FIG. 4, where n=3.

A final 1,600 angstrom thick layer of silicon oxide 10 was then deposited on the outermost bilayer 9, followed by a 100 angstrom thick layer 13 of indium tin oxide on the silicon oxide layer 10.

The resulting laminate of FIG. 4 had a solar absorbance of 0.08, and an IR emissivity of 0.72.

Example 5

A multilayer stack, shown in FIG. 4, was deposited on a flexible support. The flexible support was substantially similar to that used in Comparative Example 1.

A 2,000 angstrom thick layer of aluminum oxide 4 was deposited on silver layer 3. Next, a 500 angstrom thick layer of silicon oxide 9a was deposited on aluminum oxide layer 4, followed by deposition of a 1,500 angstrom thick layer of aluminum oxide 9b, producing a 2,000 angstrom thick $SiO_2$/$Al_2O_3$ bilayer 9. Six identical bilayers 9 were then deposited sequentially on the first bilayer 9, producing an approximately 14,000 angstrom thick stack of bilayers 9 on aluminum oxide layer 4, as shown in FIG. 4, where n=7.

A final 500 angstrom thick layer of silicon oxide 10 was then deposited on the outermost bilayer 9, followed by a 100 angstrom thick layer 11 of indium tin oxide on the silicon oxide layer 10.

The resulting laminate of FIG. 4 had a solar absorbance of 0.08, and an IR emissivity of 0.72.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A laminate, comprising:
   a reflective support;
   a plurality of metal oxide trilayers on the reflective support, each metal oxide trilayer including:
      a layer of aluminum oxide;
      a layer of silicon oxide; and
      a layer of indium tin oxide; and
   a plurality of metal oxide bilayers on the plurality of metal oxide trilayers, each metal oxide bilayer including:
      a layer of aluminum oxide; and
      a layer of silicon oxide.

2. The laminate of claim 1, wherein the reflective support comprises a flexible substrate, a 200 to 2000 angstrom thick layer of a reflective metal, a 200 to 5000 angstrom thick adhesion layer between the substrate and the reflective metal, and a 500 to 5000 angstrom metal oxide layer on the reflective metal layer.

3. The laminate of claim 2, wherein four trilayers are deposited on the metal oxide layer.

4. The laminate of claim 2, wherein the substrate is a polymeric film having a melting point of at least 200° C.

5. The laminate of claim 4, wherein the polymeric film is a biaxially oriented polyester film or a polyimide film.

6. The laminate of claim 1, wherein each trilayer includes a 1000 to 2000 angstrom thick layer of aluminum oxide; a 500 to 2000 angstrom thick layer of silicon oxide; and a 10 to 200 angstrom thick layer of indium tin oxide.

7. The laminate of claim 1, wherein each bilayer includes a 1000 to 2000 angstrom thick layer of aluminum oxide, and a 500 to 2000 angstrom thick layer of silicon oxide.

8. The laminate of claim 1, wherein four trilayers are deposited on the reflective support.

9. The laminate of claim 1, wherein two to twenty bilayers are deposited on the plurality of metal oxide trilayers.

10. The laminate of claim 9, wherein four, eight, or twelve bilayers are deposited on the plurality of metal oxide trilayers.

11. The laminate of claim 1, wherein the reflective metal is silver, gold, or aluminum.

12. The laminate of claim 1, wherein the reflective metal is silver.

13. The laminate of claim 1, wherein the laminate has a solar absorbance of 0.07 to 0.3.

14. The laminate of claim 1, wherein the laminate has a solar absorbance of 0.09 to 0.23.

15. The laminate of claim 1, wherein the laminate has an IR emittance of 0.75 to 0.9.

16. The laminate of claim 1, wherein the laminate has an IR emittance of 0.8 to 0.86.

17. The laminate of claim 1, wherein the laminate further comprises a 50 to 200 angstrom thick layer of indium tin oxide on the outermost bilayer.

18. The laminate of claim 1, wherein the laminate further comprises a metal oxide cap layer on the outermost bilayer.

\* \* \* \* \*